United States Patent
Du-Nour

(10) Patent No.: US 7,469,164 B2
(45) Date of Patent: Dec. 23, 2008

(54) METHOD AND APPARATUS FOR PROCESS CONTROL WITH IN-DIE METROLOGY

(75) Inventor: Ofer Du-Nour, Timrat (IL)

(73) Assignee: Nanometrics Incorporated, Milpitas, CA (US)

( * ) Notice: Subject to any disclaimer, the term of this patent is extended or adjusted under 35 U.S.C. 154(b) by 0 days.

(21) Appl. No.: 11/717,327

(22) Filed: Mar. 12, 2007

(65) Prior Publication Data

US 2007/0298522 A1 Dec. 27, 2007

Related U.S. Application Data

(60) Provisional application No. 60/816,815, filed on Jun. 26, 2006, provisional application No. 60/817,014, filed on Jun. 26, 2006, provisional application No. 60/816,893, filed on Jun. 26, 2006.

(51) Int. Cl.
*G06F 19/00* (2006.01)
(52) U.S. Cl. .................. 700/110; 700/30; 700/121; 700/174; 700/175; 438/17; 356/630
(58) Field of Classification Search .............. 700/30, 700/108–110, 121, 160, 164, 174, 175; 438/5, 438/7–9, 16; 451/5, 6, 8, 287, 288; 356/630, 356/631
See application file for complete search history.

(56) References Cited

U.S. PATENT DOCUMENTS

| | | | |
|---|---|---|---|
| 5,867,276 A | 2/1999 | McNeil et al. | |
| 6,242,739 B1 | 6/2001 | Cherkassky | |
| 6,383,824 B1 * | 5/2002 | Lensing | 438/14 |
| 6,413,867 B1 * | 7/2002 | Sarfaty et al. | 438/689 |
| 6,479,309 B1 * | 11/2002 | Wright | 438/16 |
| 6,483,580 B1 | 11/2002 | Xu et al. | |
| 6,678,055 B2 | 1/2004 | Du-Nour et al. | |
| 6,762,838 B2 | 7/2004 | Du-Nour | |
| 6,801,321 B1 | 10/2004 | Du-Nour | |
| 6,885,467 B2 | 4/2005 | Du-Nour et al. | |
| 6,950,196 B2 | 9/2005 | Fielden et al. | |
| 7,092,096 B2 * | 8/2006 | Tao et al. | 356/369 |
| 2003/0049390 A1 * | 3/2003 | Shanmugasundram et al. | 427/585 |

OTHER PUBLICATIONS

Ying Wang, "Integrated dielectric trench-depth measurement for dual damascene", Solid State Technology, vol. 42, No. 12, Dec. 1, 2004, 8 pgs total.

* cited by examiner

*Primary Examiner*—Sean P Shechtman
(74) *Attorney, Agent, or Firm*—Silicon Valley Patent Group LLP

(57) ABSTRACT

Various embodiments include a method for providing instructions to a process tool. The method includes emitting an incident light beam at a substrate, receiving a reflected light beam from the substrate and determining a spectrum of the reflected light beam. The method further includes determining a first property of a first layer of the substrate and a second property of a second layer of the substrate, based on the spectrum determination. The method further includes comparing the first property of the first layer to a first reference property and comparing the second property of the second layer to a second reference property. The method further includes determining the instructions based on the first property comparison and the second property comparison; and providing the instructions to the process tool.

32 Claims, 9 Drawing Sheets

400
Actual cross section

410
Effective cross section

US 7,469,164 B2

METHOD AND APPARATUS FOR PROCESS CONTROL WITH IN-DIE METROLOGY

CROSS-REFERENCE TO RELATED APPLICATIONS

The present application incorporates by reference U.S. Provisional Patent Application Ser. No. 60/816,815 filed on Jun. 26, 2006 for "Integrating a Metrology Instrument for Multi-film Testing," U.S. Provisional Patent Application Ser. No. 60/817,014 filed on Jun. 26, 2006 for "Thickness and Optical Property of a Multi-film Stack Using Wavelength Illumination Filtering for Film Separation," and U.S. Provisional Patent Application Ser. No. 60/816,893 filed on Jun. 26, 2006 for "System and Methods for Single Wafer Process Control."

BACKGROUND OF THE INVENTION

1. Field of the Invention

The present invention relates to semi-conductor manufacturing equipment and more particularly a method and apparatus for providing instructions to process tools.

2. Description of Related Art

Semiconductor manufacturing involves various steps such as adding material to a layer, removing material from a layer or modifying a layer of a substrate. Material may be added, removed, and/or modified selectively or in bulk. The steps may result in modifying physical properties of the layers, such as thickness of the layer, index of refraction of the layer, coefficient of absorption of the layer etc., which may affect the performance of the semiconductor. Thus, it is useful to measure and control the properties of the various layers.

One method of measuring the properties is to cut (e.g., scribe and break) the substrate through a feature of interest, thus exposing a cross-section of the feature. The feature may then be examined using microscopy, for example, scanning electron microscopy (SEM). Unfortunately, the substrate is generally destroyed by cutting. Moreover, the number of features that can be examined may be limited to features lying along the cut.

Another method includes creating a proxy in the form of features that are intended to be representative of one or more dies. The proxies may be placed between selected dies on the substrate. The features in the proxy may be measured during various steps in the manufacturing process using a probe in the form of a light beam having small spot size about the size of the proxy structure. However, it can be difficult to align the substrate and position the proxies within such a small spot size. Unfortunately, features in the proxies may not be representative of features in the dies.

Other methods of measuring properties of layers of a substrate include using SEM review and/or metrology tools that do not involve destroying the substrate. However, the SEM beam may burn areas of the substrate, and alignment of the small SEM beam may be difficult and/or time consuming. What is needed is an improved apparatus and method for measuring properties of a substrate to allow instructions to be sent to the process tools during operations or for future operations.

SUMMARY OF THE INVENTION

One embodiment of the present invention describes a method for providing instructions to a process tool. The method comprises emitting an incident light beam at a substrate, receiving a reflected light beam from the substrate, and determining a spectrum of the reflected light beam. The spectrum of the reflected light beam is used to determine a first property of a first layer of the substrate and a second property of a second layer of the substrate. The first property is compared to a first reference property and the second property is compared a second reference property. The first property comparison and second property comparison are used in determining the instructions which are provided to the process tool.

In various embodiments, the first and/or second properties include layer thickness, index of refraction, coefficient of absorption, and/or the like. In some embodiments, the substrate may be a wafer. In some embodiments, the process tool may use the instructions for processing subsequent substrates. Optionally, the process tool may respond to the instructions in real time while the substrate is in the process tool.

In another embodiment, the method further comprises determining properties of the first and second layers of a second substrate. The properties of the second substrate may be used with the properties of the first substrate to calibrate the process tool.

Another alternative embodiment further comprises using a spectrum from a reference wafer in determining the first and second reference properties. Alternatively, the first and second reference properties are determined from a database of spectra from two or more substrates. In some embodiments, the first and second reference properties are calculated using mathematical models.

DETAILED DESCRIPTION

Figure 1A:
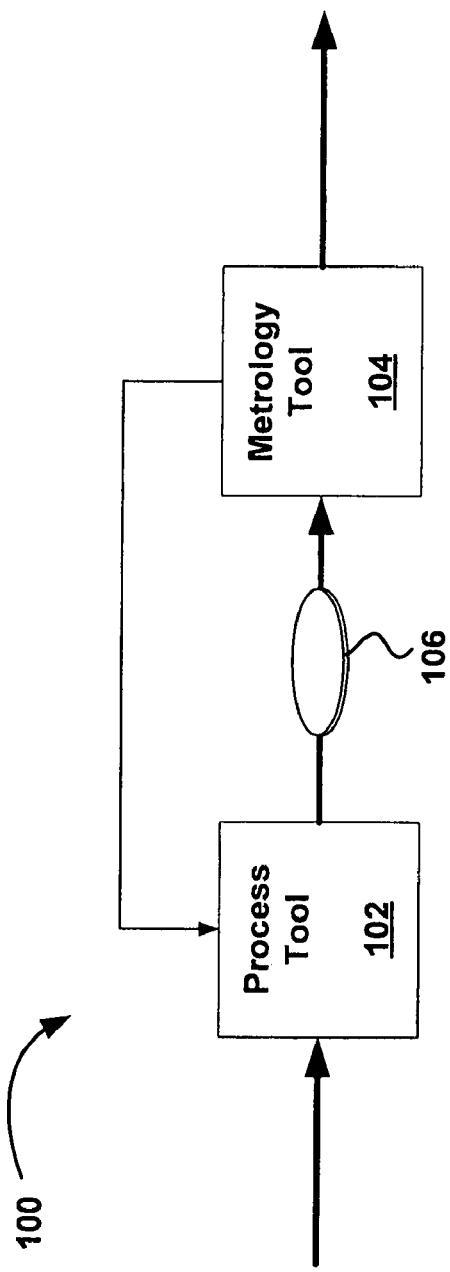
FIG. 1A is a block diagram illustrating an environment for processing a substrate.

FIG. 1A is a block diagram illustrating an environment 100 for processing a substrate 106. The processing environment 100 includes a process tool 102 and a metrology tool 104. The substrate 106 may include a silicon wafer, a photolithographic mask, a gallium arsenide wafer, a germanium wafer, etc. The process tool 102 is configured to perform a process on the substrate 106. For clarity, only one process tool 102 is illustrated in FIG. 1A; however, a person of ordinary skill in the art would understand that multiple process tools 102 may each perform one or more processes on the layer of the substrate 106. A typical substrate may include one or more semiconductor devices arranged on the substrate as an array of one or more dies, while a typical semiconductor device may include multiple layers (e.g., source layer, drain layer, capacitor layer, resistor layer, gate layer, contact pad layer, conductor layer, etc.). Typical processes, include deposition of material onto the substrate 106, removal of material from the substrate 106, patterning of the substrate 106, and selective modification of the chemical composition of material in the substrate 106 to modify electrical properties of patterned regions.

For example, the electrical properties of the substrate 106 may be modified by techniques such as doping selected regions on the substrate 106 using diffusion furnaces, implantation, rapid thermal anneal (RTA), exposure to ultraviolet light in UV processing (UVP), etc. In some embodiments, the optical properties of the substrate 106 may also be modified during modification of the electrical properties.

Deposition of material includes growing, coating, or otherwise transferring a layer of material onto the substrate 106. Well known deposition techniques include physical vapor deposition (PVD), chemical vapor deposition (CVD), electrochemical deposition (ECD), molecular beam epitaxy (MBE), atomic layer deposition (ALD) and other methods.

In various embodiments, the process tool 102 may be configured to selectively remove material from one or more layers of the substrate 106, or remove the material from the substrate 106 in bulk. For example, material may be removed using an etch process, such as wet etching in a chemical bath and/or dry etching using an ion bombardment such as reactive ion etch. In some embodiments, the process tool 102 may use etch processing to selectively remove exposed regions of a substrate after a photolithographic mask has been applied. Alternatively, the process tool 102 my be configured to remove material in bulk using, for example, etch processing, chemical-mechanical planarization (CMP) or a chemical-mechanical polishing process to planarize a top surface of the substrate 106 between levels.

Patterning techniques are typically used for selectively depositing or removing material and/or controlling the shape of the deposited material. For example, in a conventional technique known as lithography, the substrate 106 is coated with a photoresist. Selected portions of the photoresist may be exposed using a lithographic mask. The exposed regions of photoresist on the substrate 106 are then washed away by a developer solution. Alternatively, the unexposed regions of the photoresist may be washed away by the developer solution. The process tool 102 may then deposit material onto, remove material from, or modify material in the regions of the substrate 106 where the photoresist has been has been washed away.

Deposition, removal, and/or modification may be performed in multiple steps on the substrate 106. Some steps may leave a layer of material on the substrate 106 which has optical properties, such as an index of refraction, coefficient of transmission, coefficient of extinction, etc. The process tool 102 may produce a uniform layer of material across the substrate 106 or may produce a layer in selective locations on the substrate 106 using lithographic techniques, as described elsewhere herein.

The metrology tool 104 is configured to measure a property of at least one layer of material on the substrate 106 that has been deposited, removed, and/or modified by the process tool 102. The metrology tool 104 is further configured to provide information about the one or more layers of the material on the substrate 106 to the process tool 102. The process tool 102 may use the information received from the metrology tool 104 to modify a process being applied to a subsequent substrate 106.

Figure 1B:
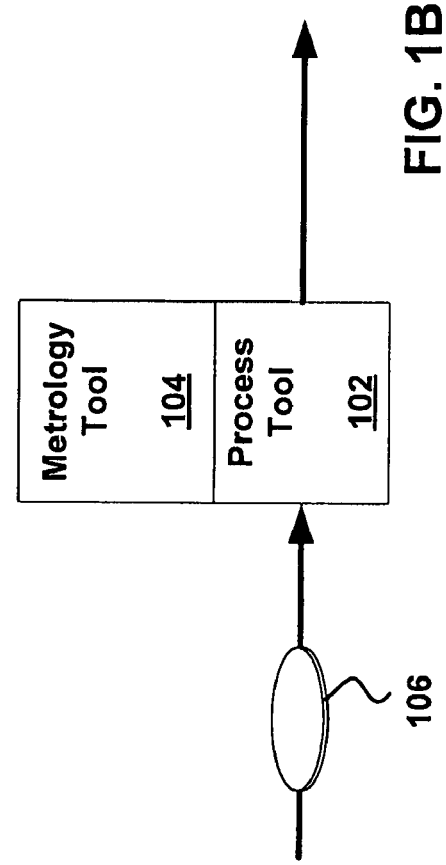
FIG. 1B is a block diagram illustrating an alternative embodiment of an environment for processing a substrate.

FIG. 1B is a block diagram illustrating an alternative embodiment of an environment 100 for processing the substrate 106. FIG. 1B differs from FIG. 1A in that the metrology tool 104 is configured to measure the substrate 106 while the substrate 106 is in the process tool 102 and a process is being performed on the substrate 106. In some embodiments, the process tool 102 is configured to receive measurements from the metrology tool 104 during the process and modify the process according to the information received from the metrology tool. For example, the process tool 102 may receive real time measurements of a thickness of one or more layers of the substrate 106 from the metrology tool 104 during material deposition, and may stop the deposition in response to the real time measurements to achieve a desired thickness of the one or more layers.

Figure 2:
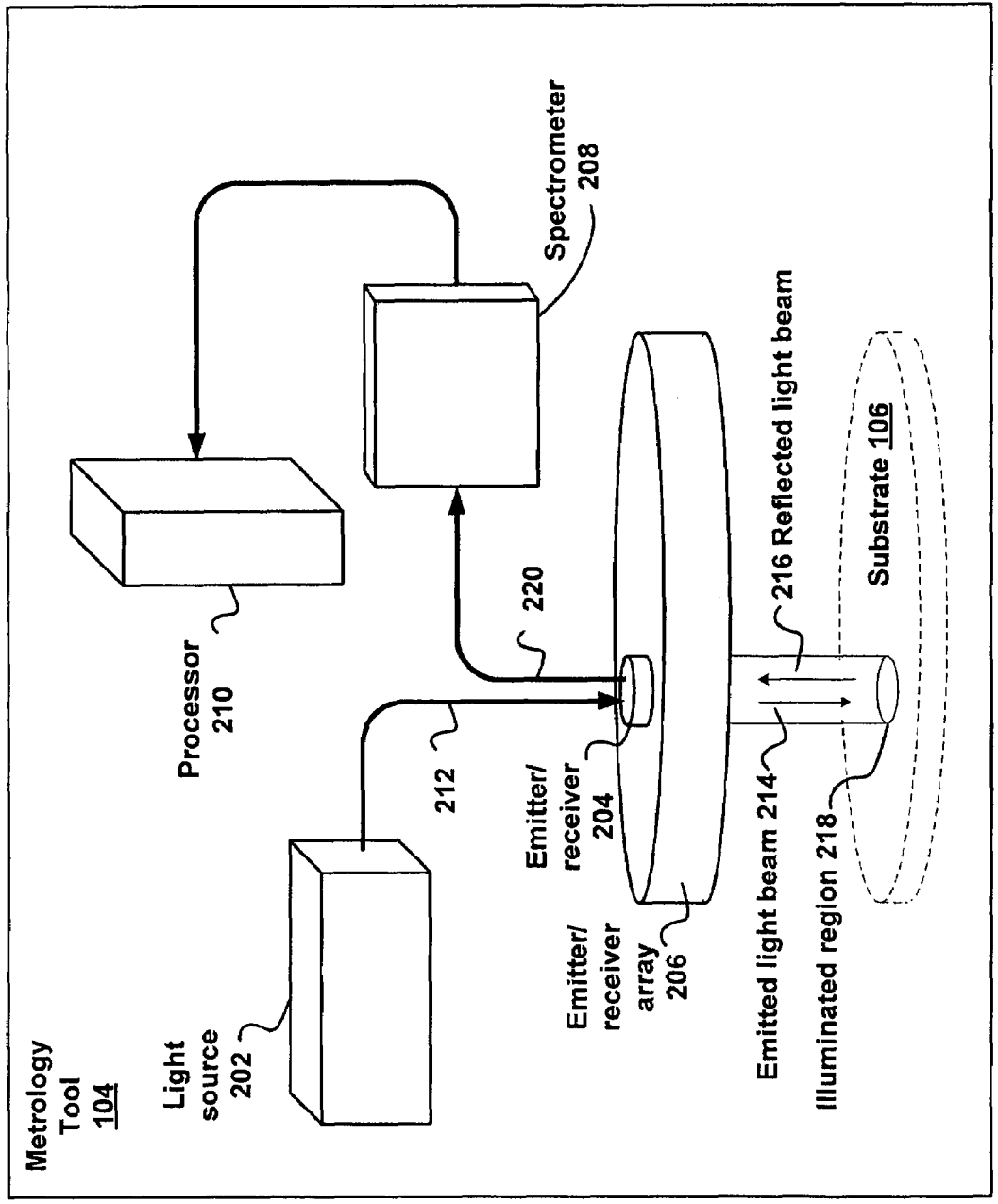
FIG. 2 is a block diagram illustrating the metrology tool of FIG. 1A and/or FIG. 1B, according to one embodiment.

FIG. 2 is a block diagram illustrating the metrology tool 104 of FIG. 1A and/or 1B, according to one embodiment. The metrology tool 104 includes a light source 202, an emitter/receiver 204, an emitter/receiver array 206, an optional spectrometer 208, and an optional processor 210. The light source 202 is configured to produce a light. The light may be coupled to the emitter/receiver 202 using an optional fiber optic conductor 212. The emitter/receiver 204 is configured to emit an incident light beam 214 at the substrate 106. In some embodiments, the emitter/receiver 204 may be combined with the light source 202, and the fiber optic conductor 212 may be omitted. In various embodiments, the light source 202 may include an incandescent light, a light emitting diode (LED), a laser, etc.

The light source 202 may be configured to emit the incident light beam 214 as monochromatic light or as light in one or more selected bands of the visible, infrared, and/or ultraviolet light spectrum. The light beam 214 may include polarized light, non-polarized light, or a combination of polarized and non-polarized light. In some embodiments, the light source 202 may be configured to emit a beam in the electromagnetic spectrum outside the light spectrum. The emitter/receiver 204 may include optical components configured to collimate and/or focus the incident light beam 214 (e.g., at a plane of the substrate 106), using techniques which are known in the optic art. In various embodiments, the light source 202 may be configured to provide a continuous incident light beam 214, pulsed incident light beam 214, an on demand incident light beam 214, and so forth.

The emitter/receiver array 206 is configured to dispose the emitter/receiver 204 in a position for emitting the incident light beam 214 at the substrate 106. While only one emitter/receiver 204 is illustrated in the emitter/receiver array 206 of FIG. 2, it is contemplated that there are a plurality of emitter/receivers 204 may be disposed in the emitter/receiver array 206. Multiple emitter/receivers 204 disposed in the emitter/receiver array 206 may provide simultaneous measurements of multiple sites on the substrate 106, thus enhancing throughput. In some embodiments, the emitter/receiver 204 may be configured to emit the incident light beam 214 normal to the substrate 106, which may render the light beam 106 less sensitive to effects of an uneven surface in the substrate 106.

The incident light beam 214 may be configured to illuminate a region 218 on the substrate 106, and may be reflected from the substrate 106, becoming a reflected light beam 216. The emitter/receiver 204 may be further configured to receive the reflected light beam 216. While the emitter and the receiver of the emitter/receiver 204 are illustrated as combined, the emitter may be disposed in a separate location on the emitter/receiver array 206 from the receiver.

The metrology tool 104 may be configured to illuminate the substrate 106 while the substrate 106 is located inside the metrology tool 104; alternatively, the metrology tool 104 may be positioned near a path of the substrate 106. Optionally, the metrology tool 104 is configured to illuminate the substrate 106 with the incident light beam 214 and receive the reflected light beam 216 while the substrate 106 is in transit on a path of the substrate 106. In some embodiments, the metrology tool 104 may be combined with the process tool 102 and configured to illuminate the substrate 106 while the substrate 106 is inside the process tool 102.

The spectrometer 208 is configured to receive the reflected light beam 216 from the emitter/receiver 204 and convert the reflected light beam 216 to a digital signal having a format of intensity as a function of wavelength.

The processor 210 is configured to receive the digital signal from the spectrometer 208 and determine a spectrum of the reflected light beam 216 from digital signal. The processor 210 may use a Fourier transform and/or various other transforms (e.g., a chirplet transform, a Hartley transform, a Z-transform, a constant-Q transform, etc.) to determine the spectrum of the reflected light beam 216. In various embodiments, the processor 210 may use hardware, firmware, and/or software to determine the spectrum. For example, the processor 210 may include a digital signal processor (DSP), including firmware, configured to determine the spectrum of the reflected light beam 216. In some embodiments, the processor may also receive a digital signal representing incident light beam 214 and determine the spectrum of the incident light beam 214. In some embodiments the processor 210 and the spectrometer 208 may be combined. The processor may be further configured to use the digital data received from the spectrometer 208 to determine a property of at least one layer of material on the substrate 106 that has been deposited, removed and/or modified by the process tool 102.

Alternatively, the spectrometer 208 is combined with a spectrum analyzer configured to determine a spectrum of the reflected light beam 216. The spectrum analyzer may determine the spectrum using software and/or hardware similar to the processor 210. In some embodiments, the spectrometer 208 may also receive the incident light beam 214 and the spectrum analyzer may determine the spectrum of the incident light beam 214. The processor 210 may receive the spectrum data from the spectrum analyzer. In some embodiments the processor 210, the spectrometer 208, and the spectrum analyzer may be combined.

Figure 3:
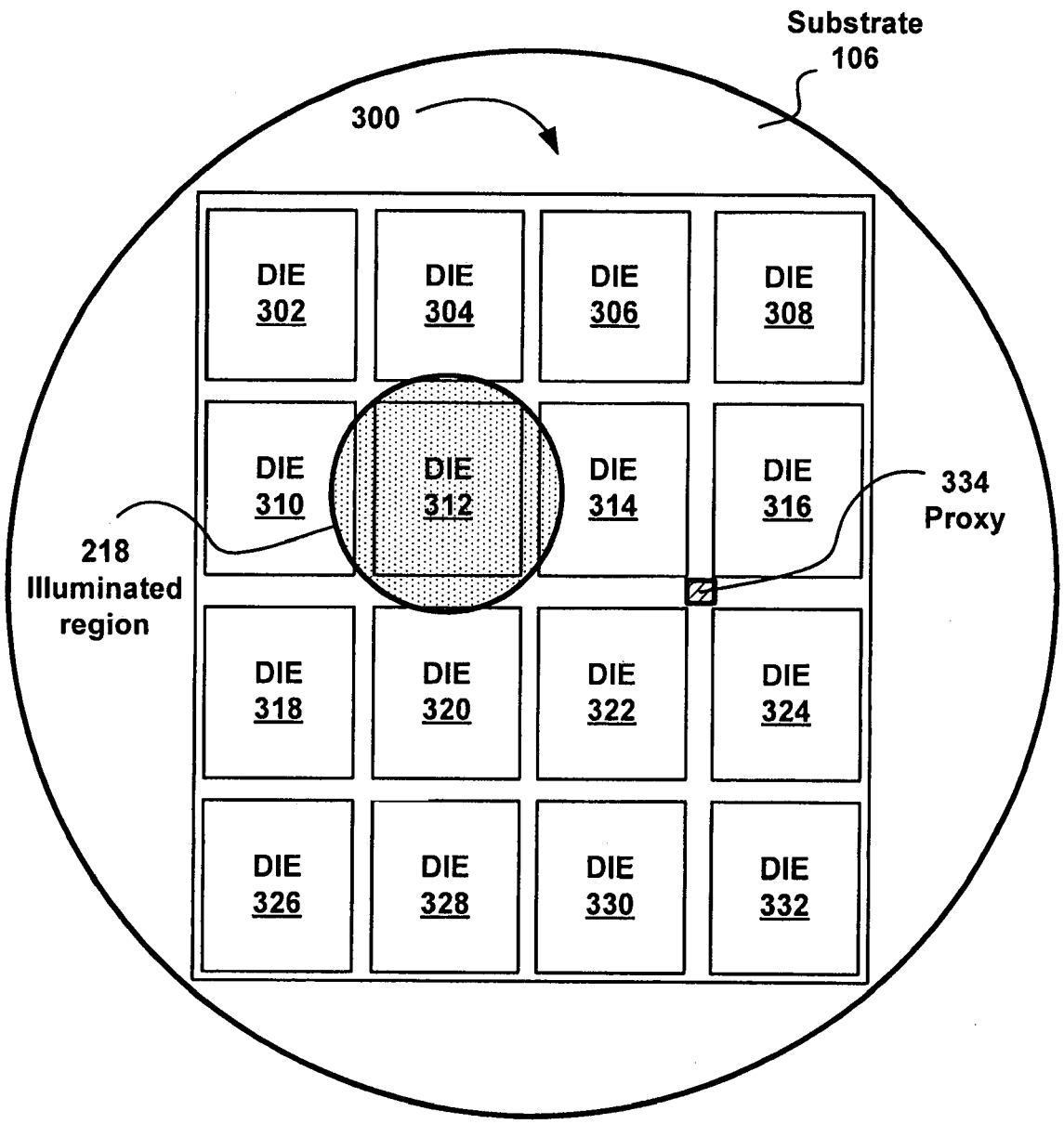
FIG. 3 is a top plan view of an exemplary substrate.

FIG. 3 is a top plan view of an exemplary substrate 106. The surface of the substrate 106 is illustrated as including an array of dies 300, which includes dies 302-332. In various embodiments, the dies 302-332 may be identical, different, or comprise one or more repeating patterns of sub arrays or any other arrangement. The region 218 is illustrated as illuminating an exemplary die 312. In various embodiments, the region 218 may illuminate the entire die 312, a portion of the die 312, another die of the array 300, or multiple dies (e.g., die 314, 316, 322, and 324). The substrate may be illuminated using the light beam 214 without damaging or modifying the portion of the substrate 106 in the region 218, e.g., the die 312. In some embodiments, a proxy 334 may be included on the surface of the substrate 106 (e.g., between the dies in streets and/or alleys) for monitoring the process tool 102.

Figure 4A:
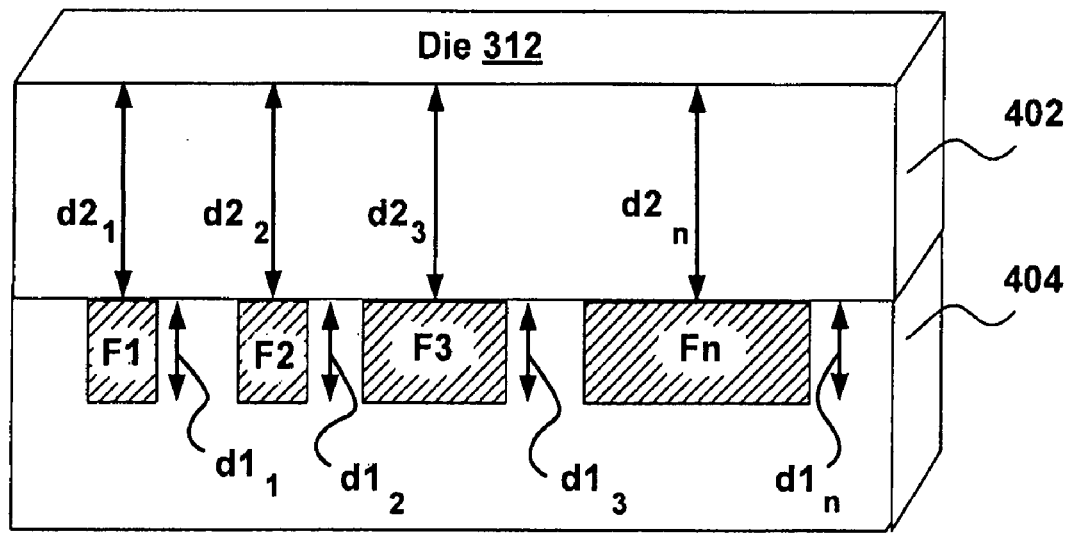
FIG. 4A is a perspective view of an exemplary cross-section of a die in the substrate of FIG. 3, according to one embodiment.

FIG. 4A is a perspective view of an exemplary cross-section 400 of a die such as the die 312 in the substrate 106 of FIG. 3. The die 312 includes layers 402 and 404. The layer 404 includes one or more production features F1, F2, F3, ... Fn (F1-Fn) that may be illuminated within the region 218. A person of ordinary skill in the art will understand that the layer 404 may include thousands or millions of production features F1-Fn falling within the region 218. In some embodiments, the production features F1-Fn may include a plurality of features having a common property. For example, the production features F1-Fn may include some number of filled trenches, all placed in the layer 404 within the region 218 of the substrate 106 and having about the same thickness. In some embodiments, each production feature F1-Fn may have certain properties, such as thicknesses, $d1_1, d1_2, d1_3, \ldots d1_n$ ($d1_1$-$d1_n$), respectively. While $d1_1$-$d1_n$ are used in FIG. 4A to represent thicknesses of production features F1-Fn respectively, a practitioner with ordinary skill in the art will understand that $d1_1$-$d1_n$ may also represent properties other than thickness, such as index of refraction, coefficient of absorption, etc.

The layer 402 may include a bulk layer of material disposed above the layer 404 of production features F1-Fn. The layer 402 may have different properties, such as thicknesses $d2_1, d2_2, d2_3, \ldots d2_n$ ($d2_1$-$d2_n$), immediately above the different production features F1-Fn respectively. While $d2_1$-$d2_n$ are used illustratively to represent thicknesses of the layer 402 above the production features F1-Fn respectively, a practitioner with ordinary skill in the art will again understand that $d2_1$-$d2_n$ may also represent properties other than thickness, such as index of refraction, coefficient of absorption, etc.

Figure 4B:
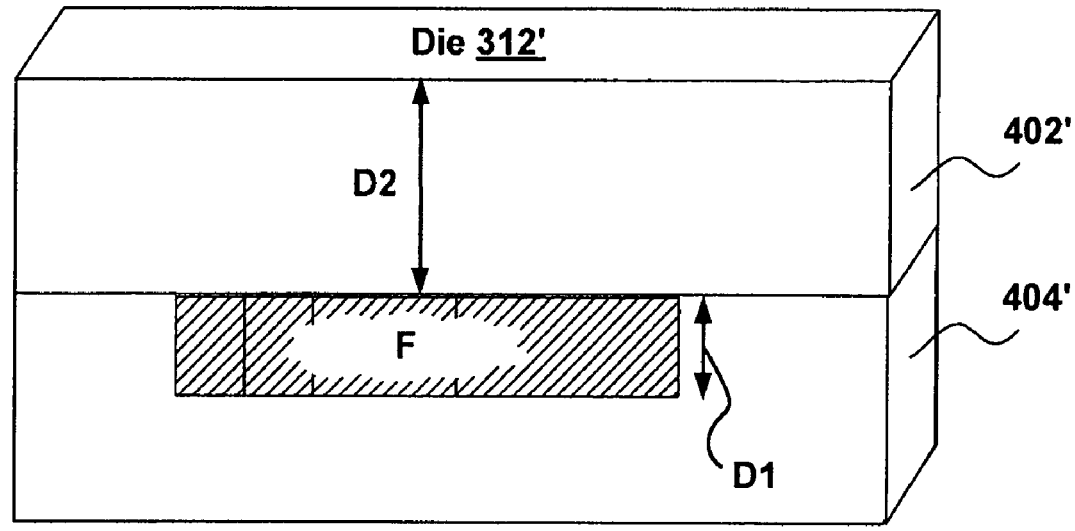
FIG. 4B is a perspective view of an effective cross-section of the die of FIG. 4A, according to one embodiment.

FIG. 4B is a perspective view of an effective die 312'. The die 312' represents a mathematical model of the die 312. The die 312' includes a layer 404', and a layer 402'. The die 312' further includes an effective feature F in the layer 404', which is equivalent to combining the production features F1-Fn in the layer 404 into a single feature. The effective feature F has an effective thickness D1. The effective thickness D1 is mathematically equivalent to the average of the individual thicknesses $d1_1$-$d1_n$ of the respective production features F1-Fn.

The layer 402' includes the bulk layer of material disposed above the layer 404'. The layer 402' includes an effective thickness D2 of the bulk layer of material immediately above the effective feature F. The effective thickness D2 is mathematically equivalent to the average of the thicknesses $d2_1$-$d2_n$ of the material immediately above the respective features F1-Fn. The spectrum of the reflected light beam 216 from the cross-section 400 of the die 312 is mathematically equivalent to a spectrum of a reflected light beam that would be measured from an effective cross-section 410 of the effective die 312. For purposes of this application, the term virtual cross-section is equivalent to the term effective cross-section.

In some embodiments, an actual die 312' may be constructed. For example, the proxy 334 may be constructed having the effective cross-section 410. Thus, a light beam reflected from the proxy 334 has a spectrum representative of the cross-section 410. However, the spectrum of the actual cross-section 400 may include additional information. For example, an array of dense, small features F1-Fn, may react differently to a process condition than an equivalent large isolated feature such as the effected feature F. Moreover, the standard deviation of the thicknesses d1-dn, that may not be available from the spectrum of the effective cross-section 410.

Figure 5A:
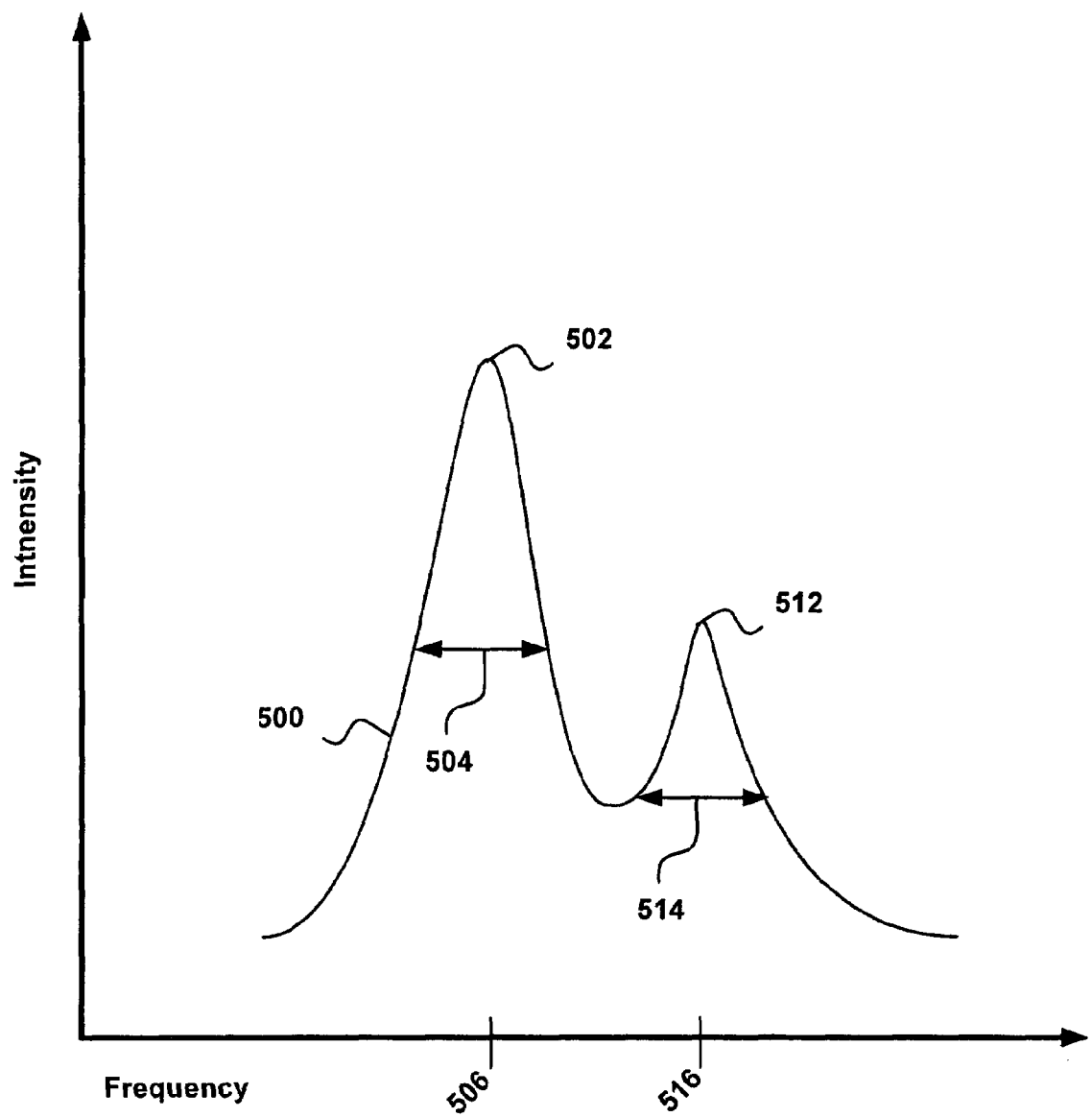
FIG. 5A illustrates graph of an exemplary spectrum of a beam reflected by the die, after been treated mathematically to show the frequencies related to the different layers on the die, of FIG. 4A, according to one embodiment.

FIG. 5A illustrates a graph of an exemplary spectrum 500 of a beam reflected by the die 312 of FIG. 4A. The horizontal axis may represent frequency, wave length, or other parameters. The vertical axis may represent intensity, amplitude, photon count, or other parameters. As shown, the spectrum 500 shows intensity versus frequency and has a peak 502 at a frequency 506 with a width 504. The spectrum 500 further has a lesser peak 512 at a frequency 516 with a width 514.

The frequency 506 of the peak 502 may indicate a property such as the effective thickness D1 of the effective feature F in the layer 404' in the die 312', which is equivalent to the average of the individual thicknesses of d1-dn of features F1-Fn respectively. The frequency 516 of the peak 512 may similarly indicate the effective thickness D2 of the material in the layer 402' above the effective feature F, which is equivalent to the average of the thicknesses $d2_1$-$d2_n$ of the material immediately above the respective features F1-Fn. Thus, the effective cross-section 410 may be represented by the frequencies 506 and 516 of the peaks 502 and 512 respectively.

The width 504 of the peak 502 may indicate a uniformity of the thicknesses $d1_1$-$d1_n$ of the production features F1-Fn in the layer 404 of the die 312, while the width 514 of the peak 512 may likewise indicate a uniformity of the thicknesses $d2_1$-$d2_n$ of the material in the layer 402 above those features. The widths 504 and 514 may also indicate the random noise in the reflected light beam 216. The noise of the peaks 502 and 512 generally depends on the number of features F1-Fn, i.e., increasing the number of features averaged into the spectrum may decrease the noise. Thus, height of the peak 502 may indicate the number of features F1-Fn.

Figure 5B:
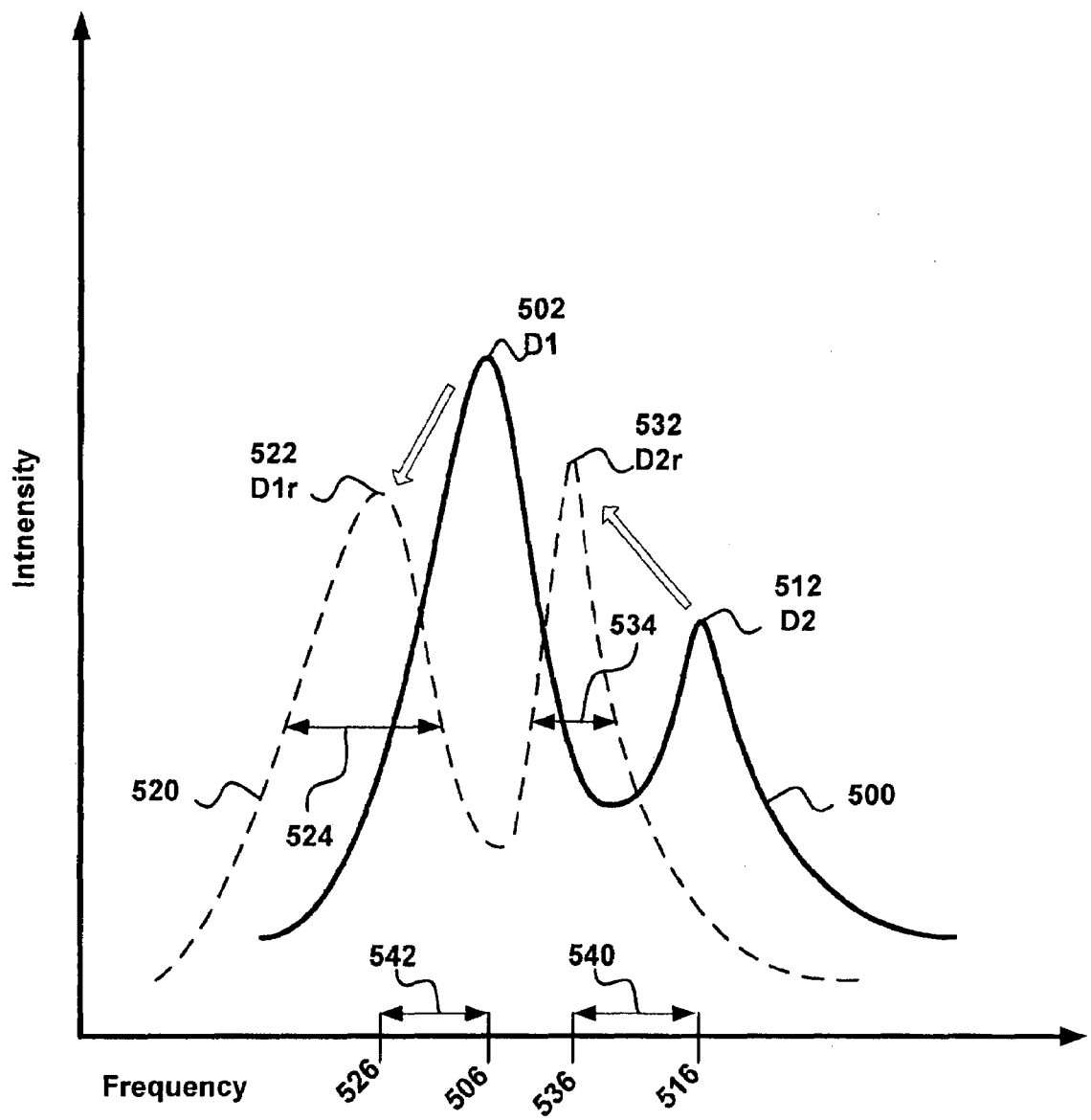
FIG. 5B illustrates the exemplary spectrum of FIG. 5A and a reference spectrum, according to one embodiment.

FIG. 5B illustrates the exemplary spectrum 500 of FIG. 5A and a possible reference spectrum 520. The reference spectrum 520 includes a peak 522 at a frequency 526 with a width 524 and another peak 532 at a frequency 536 with a width 534. The peak 522 may be representative of the effective thickness D1$r$ of a reference substrate. The peak 532 may be representative of the effective thickness D2$r$ of the reference substrate.

The reference spectrum 520 may be determined using optical measurements of a reference substrate which has known performance characteristics, or by averaging the measurements of a group of such substrates. Alternatively, the reference substrate may be determined using optical measurements of a proxy (e.g., the proxy 334). The thicknesses D1$r$ and D2$r$ may be determined directly, for example, using SEM measurements of thicknesses of the layers of the reference substrate (or group of reference substrates) and/or the proxy 334. The reference spectrum 520 may also be calculated numerically and/or analytically using desired thicknesses D1$r$ and D2$r$ of a mathematical model of a reference substrate.

The reference spectrum 520 may be used to resolve ambiguities in associating features in the spectrum 500 determined using the metrology tool 104 with features within the substrate 106. For example, in some cases it may be unclear whether the peak 502 or the peak 512 in the spectrum 500 is associated with the effective thickness D2. However, a comparison to the reference spectrum 520 might indicate that the peak 512 corresponds to the peak 532-and can be associated with the effective thickness D2, while the peak 502 corresponds to the peak 522 and can be associated with the effective thickness D1.

In addition, the frequency 506 of the peak 502 in the spectrum 500 may be compared to the frequency 526 of the peak 522 in the reference spectrum 520, to determine the difference 542. Similarly, the frequency 516 of the peak 512 in the spectrum 500 might be compared to the frequency 536 of the peak 532 in the reference spectrum 520, to determine the difference 540.

In various embodiments, the frequencies 506 and 516, the widths 504 and 514, the frequency differences 540 and 542, and the reference frequencies 526 and 536 may be used singularly and/or in various combinations for adjusting the process tool 102. Adjustments to the process tool 102 may include determining process parameters, characterizing equations for determining process parameters, characterizing equations for determining properties of layers based on the frequencies, characterizing the process parameters and so forth.

It may be appreciated by a person with ordinary skill in the art that FIGS. 5A and 5B are illustrative only, and that a spectrum 500 including more than two peaks and/or a reference spectrum 520 including more than two peaks may be used. In some embodiments, the number of peaks that may be useful, i.e., the resolution of the spectrum 500 and/or the reference spectrum 520, may be increased when the peak widths are decreased and/or the bandwidth of the incident light beam 214 is increased. For example, the peak widths 504 and 514 may be decreased (and the peak heights increased) by increasing the diameter of the region 218, thus decreasing the noise by increasing the number of features F1-Fn averaged into the spectrum 520. It may be further appreciated by a person with ordinary skill in the art that the spectrum 500 and reference spectrum 520 may be represented as entries in an array or a database including peaks, mean frequencies, statistical distributions, vectors, raw data, etc.

Figure 6:
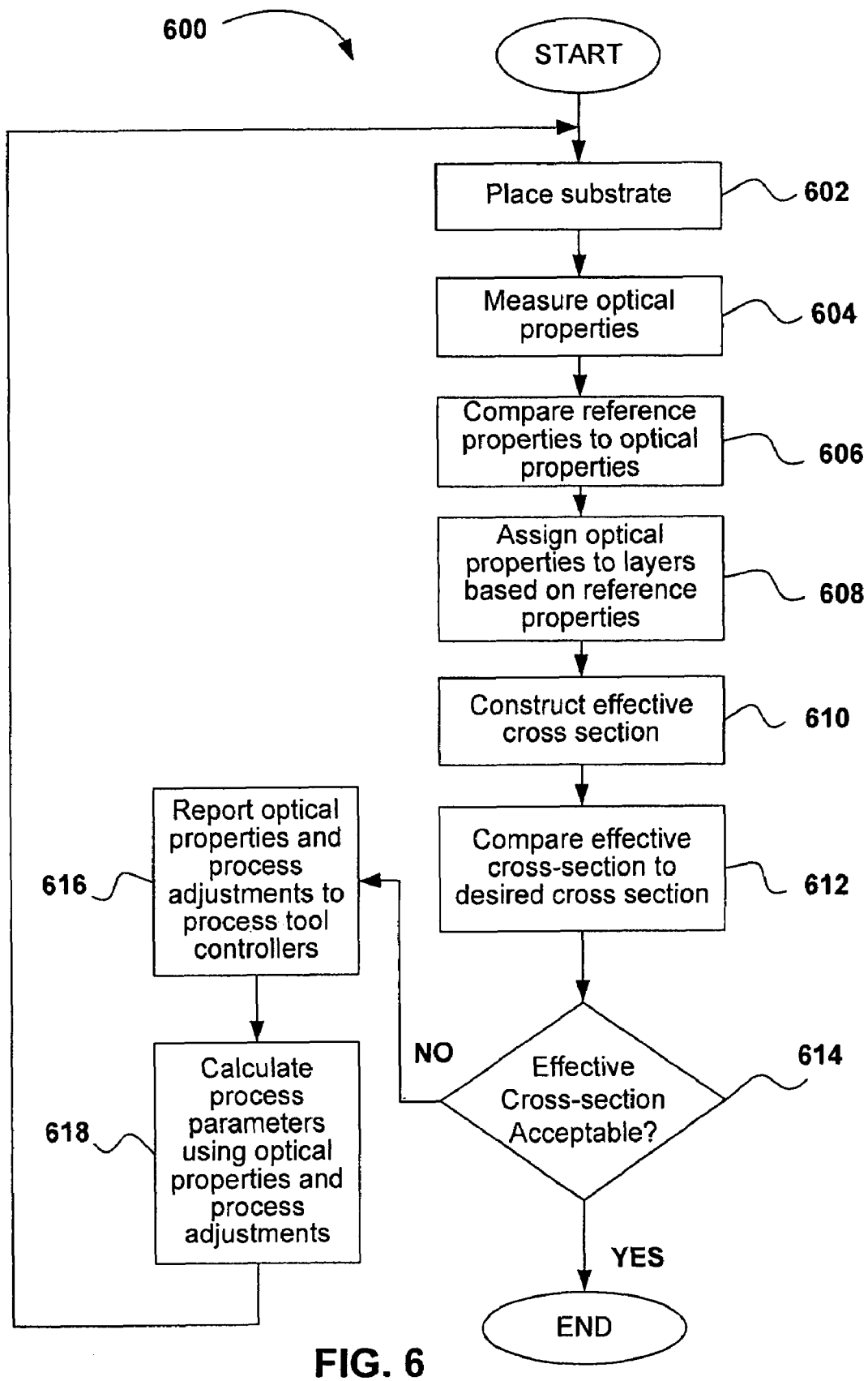
FIG. 6 is a flow diagram of an exemplary process tool operation method, according to one embodiment.

FIG. 6 is flow diagram of an exemplary process tool operation method 600, according to one embodiment. A substrate, such as the substrate 106, which has been output from a process tool, such as the process tool 102, is measured using a metrology tool, such as the metrology tool 104. The measurements are used for monitoring and providing adjustment to the process tool 102. The method 600 may be used to sample a small number of the substrates 106 output from the process tool 102. Alternatively, all or most of the substrates 106 that are output from the process tool 102 may be placed in the metrology tool 104 for measurement.

In step 602 the substrate 106 is placed in or near the metrology tool 104 in an appropriate location for conducting measurements, as discussed above.

In step 604 the optical properties of the substrate 106 are measured using the metrology tool 104. As above, measuring the optical properties may include using a spectrometer and processor, such as the spectrometer 208 and the processor 210, to determine the spectrum 500 of the reflected light beam 216 from the substrate 106. Optical properties include the spectrum 500 of the reflected light beam 216, as well as properties inferred from the spectrum 500, such as thickness, index of refraction, coefficient of transmission, and so forth. Again, the optical properties may be represented by entries in a database, including peaks, mean frequencies, statistical distributions, vectors, raw data, etc.

In step 606 the optical properties of the substrate 106 are compared to reference properties, which may be determined by various methods as discussed previously. The reference properties may also be represented by entries in a database.

In optional step 608 optical properties are assigned to layers in the substrate 106, based on properties of the layers in the reference substrate. For example, as above, the peaks 502 and 512 in the spectrum 500 may be associated with the peaks 522 and 532 in the reference spectrum 520 respectively. Thus, the peaks 502 and 512 in the spectrum 500 may be assigned to the thicknesses D1 and D2 respectively. The comparison with the reference properties may be used to resolve ambiguities in assigning the optical properties to the layers.

In optional step 610 an effective cross-section is constructed. The optical properties of the substrate 106 may be used to calculate the effective cross-section of the substrate 106. In some embodiments, the relationship between frequency 506 of the peak 502 and frequency 526 of the peak 522 may be used to determine the effective thickness D1 of the die 312 in substrate 106. The effective thickness D1 may be determined from the optical equation:

$$D1 = K_1(f_1 - f_{1r}) + D_{1r} \qquad \text{Equation 1}$$

where $K_1$ is a proportionality constant, $f_1$ is the frequency 506 of the peak 502, $f_{1r}$ is the frequency 526 of the peak 522, and $D_{1r}$ is the thickness of the reference layer assigned to the peak 522.

Likewise, the effective thickness D2 may be determined from the equation:

$$D2 = K_2(f_2 - f_{2r}) + D_{2r} \qquad \text{Equation 2}$$

where $K_2$ is a proportionality constant, $f_2$ is the frequency 516 of the peak 512, $f_{2r}$ is the frequency 536 of the peak 532, and $D_{2r}$ is the thickness of the reference layer assigned to the peak 532.

Equations 1 and 2 illustrate a relationship between the effective thickness D1 and the frequency 506, and between effective thickness D2 and the frequency 516 respectively, as simple linear equations. However, a practitioner with ordinary skill in the art would recognize that the relationships illustrated by Equations 1 and/or 2 could be represented by polynomials of arbitrary degree, logarithmic expressions, exponential expressions, sinusoidal expressions, differential equations, integral expressions, or other equations.

In optional step 612, the effective cross-section is compared to the desired cross-section. The effective cross-section may be represented by the spectrum 500 and may be compared to a desired spectrum, such as the reference spectrum 520. Alternatively, the effective cross-section may be represented by the cross-section calculated in step 610, for example, the thicknesses D1 and D2. The desired thickness may be represented by the reference thicknesses $D_{1r}$ and $D_{2r}$, which are determined from the reference spectrum 520.

In some cases the spectrum of the desired cross-section may not be available. In such cases, the desired cross-section may be represented by thicknesses of features in a cross-section for which no spectrum has been measured or calculated. For example, the desired thicknesses may have been defined at the design stage, determined theoretically from physical models, or measured microscopically. In such cases, the thicknesses D1 and D2 are compared to values which represent desired thicknesses.

In step 614 it is determined whether the effective cross-section is acceptable. In some embodiments, it may be determined whether the effective cross-section is acceptable without calculating or constructing the effective cross-section from the spectrum. For example, the determination may be made by comparing spectrum 500 of the substrate to the reference spectrum 520. In such determination, the frequencies 506 and 516 in the spectrum 500 may be compared to the reference frequencies 526 and, 536 respectively in the reference spectrum 520. Alternatively, the effective cross-section may be determined to be acceptable when the difference 542 is less than a predetermined value and/or the difference 540 is less than a predetermined value. If the effective cross-section is determined to be acceptable at step 614 then the method 600 ends. In another example, the effective cross-section may be determined to be acceptable after a predetermined number of tries. If the effective cross-section is determined to not be acceptable at step 614 then the method 600 continues to step 616

In step 616 the optical properties (e.g., the frequencies 506 and 516, the widths 504 and 514, etc.) and the relationships between the observed spectrum and the reference spectrum (e.g., Equations 1 and 2) are reported to the process tool 102.

In step 618 process parameters are calculated for the process tool 102 based on the comparison of the optical properties of the substrate 106 to the reference properties (e.g., the frequencies 506 and 516, the widths 504 and 514, etc.). Such process parameters may include time, concentrations of chemicals, flux of ions, field strength of magnetic and/or electric fields, angular velocity of a spinning substrate, distance between a substrate and a source, etc.

For example, a process parameter comprising a deposition time $T_1$ may be determined using a process relationship represented by the equation $$T_1 = H_1(D1 - D1_r) + C_1 \qquad \text{Equation 3}$$

where $H_1$ is a proportionality constant, D1 is the effective thickness of an effective layer (e.g., the layer 404'), $D1_r$ is the effective thickness of a reference layer, and the constant $C_1$ is a base deposition time constant. The process tool 102 may use the new process parameters to continue production in the production environment 100.

In some embodiments, the process parameter $T_1$ may be determined using a process relationship represented by a linear equation including optical properties of multiple layers. For example, the process parameter $T_1$ may be determined using a process relationship represented by the equation $$T_1 = H_1(D1 - D1_r) + H_2(D2 - D2_r) + C_1 \qquad \text{Equation 4}$$

where $H_2$ is a proportionality constant, D2 is the effective thickness of another layer (e.g., the layer 402') and $D2_r$ is the effective thickness of another reference layer.

The process relationships set forth in the examples of Equation 3 and Equation 4 are linear equations. However, a practitioner with ordinary skill in the art would recognize that the process relationships illustrated by Equations 3 and/or 4 may be represented by polynomials of arbitrary degree, logarithmic expressions, exponential expressions, sinusoidal expressions, differential equations, integral expressions, etc.

Once the process parameters are calculated, the method 600 returns to step 602 where subsequent substrates in the processing environment 100 may be placed in the metrology tool 104 for measuring and providing further instructions for the process tool 102.

Figure 7:
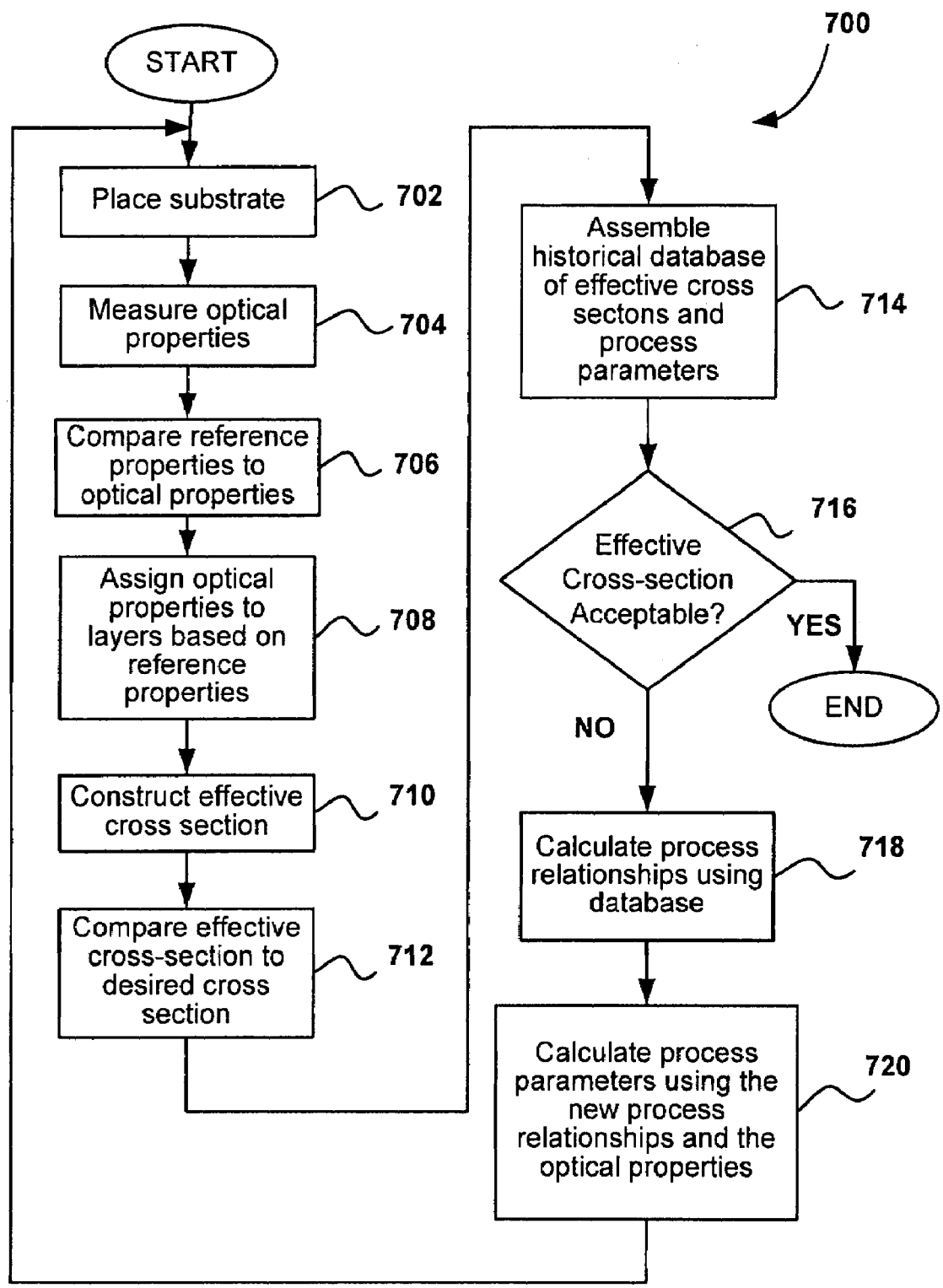
FIG. 7 is a flow diagram of an exemplary process tool calibration method, according to one embodiment.

FIG. 7 is a flow diagram of exemplary process tool calibration method 700, according to one embodiment. The steps 702-712 of the method 700 may be identical to the steps 602-612 respectively of the method 600. The measurements made in the steps 702-712 may be used for calculating adjustments for the process tool 102, as discussed elsewhere herein.

In step 714 a database is constructed of effective cross-sections and process parameters. The process parameters used by the process tool 102 to produce substrates 106 may be associated with the effective cross-sections for the respective substrates 106 in the database. The database may contain data from prior substrates having desirable characteristics and/or from mathematical models of the substrates, and/or may contain data from proxies. The database entries may include peaks, mean frequencies, statistical distributions, vectors, etc.

In step 716 it is determined whether the effective cross-section is acceptable, i.e., whether the effective cross-section matches the reference cross-section. If the effective cross-section is acceptable then the process relationships (e.g., Equations 3 and/or 4) may be sufficiently accurate to use during production for correcting the process parameters in the process tool 102, and method 700 may end. If the effective cross-section is not acceptable, the method 700 proceeds to step 718.

In step 718 process relationships are calculated based on the data in the database. For example, the proportionality constant Hi and/or base exposure time constant $C_1$ in Equation 3 may be calculated in step 718 using the database of effective cross-sections and associated process parameters. In various embodiments, the constants $H_1$ and/or $C_1$ may be calculated using numerical analysis, graphical methods, statistical analysis, statistical curve fitting, etc.

Alternatively, the constants $H_1$, $H_2$, and/or $C_1$ may be calculated for Equation 4 in step 718 by applying numerical analysis, graphical methods, statistical analysis, statistical curve fitting, etc to the database of effective cross-sections and associated process parameters.

In step 720 new process parameters are calculated using the optical parameters as inputs to the new process relationships calculated in step 718. For example, the thicknesses D1, D2, $D1_r$, and $D2_r$, may be input to Equation 3 and/or 4 and the process parameters $T_1$ and/or $T_2$ may be determined using the new values for $H_1$, $H_2$, and/or $C_1$, calculated in step 718.

While the optical parameters may be represented by the thicknesses D1, D2, $D1_r$, and $D2_r$, a practitioner with ordinary skill in the art would recognize that the thicknesses D1, D2, $D1_r$, and $D2_r$ may be derived from direct optical measurements (e.g., frequencies $f_1$, $f_{1r}$, $f_2$, $f_{2r}$, etc.) using Equation 1 and 2. Thus, in one embodiment, the optical parameters may be represented by the frequencies $f_1$, $f_{1r}$, $f_2$, $f_{2r}$ which may be used as inputs to the Equation 3 and/or 4 for calculating process parameters $T_1$ and/or $T_2$ respectively.

Upon calculating the process parameters at step 720, the method 700 returns to step 702 where subsequent substrates in the production environment 100 may be placed in the metrology tool 104 for measuring and for providing further data for the database in step 714.

Figure 8:
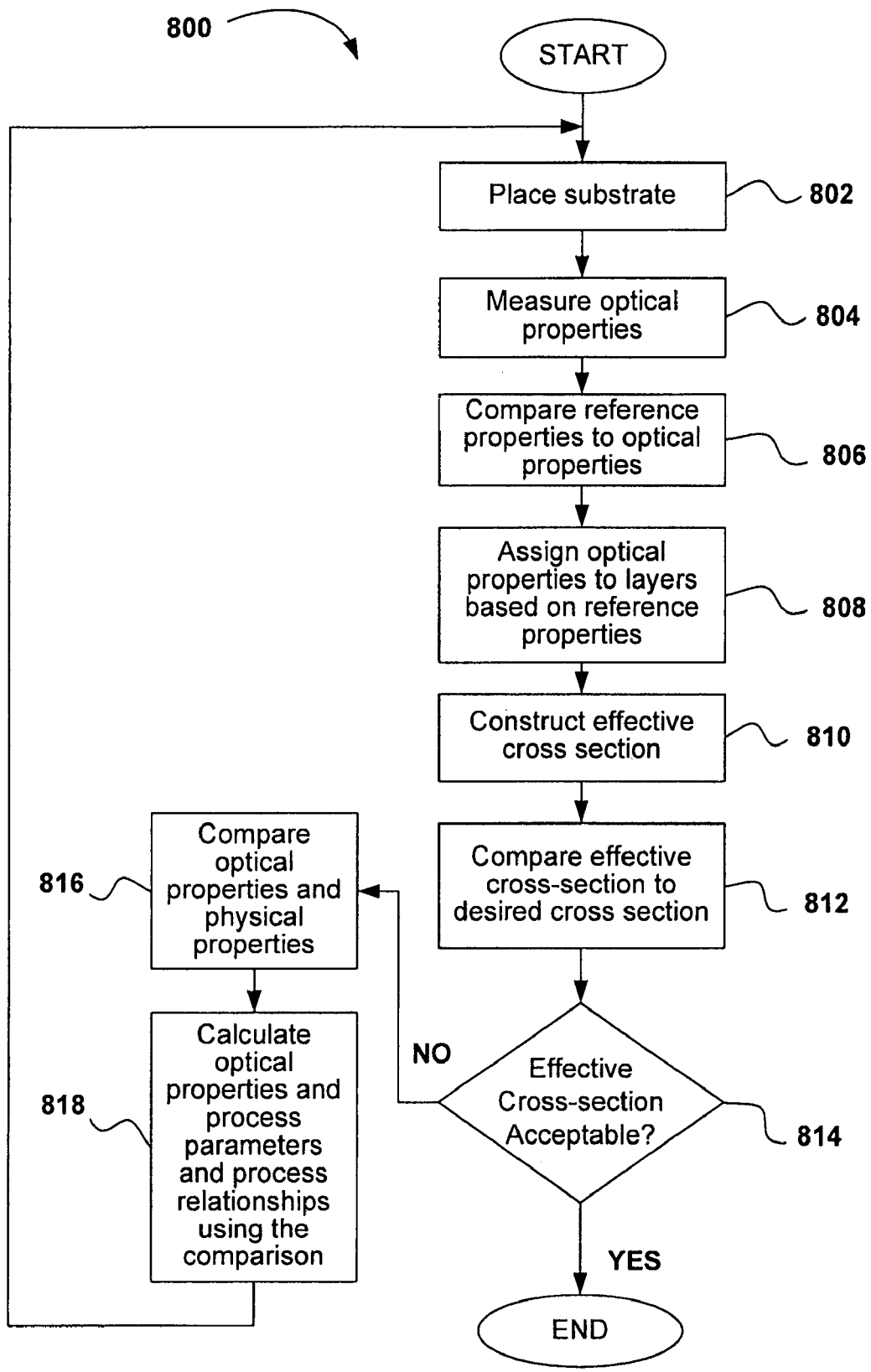
FIG. 8 is a flow diagram of an exemplary process tool development method, according to one embodiment.

FIG. 8 is a flow diagram of an exemplary process tool development method 800, according to one embodiment. The steps 802-814 of the method 800 may be identical to the steps 602-614 respectively of the method 600. The measurements made in the steps 802-814 may be used for calculating optical properties for the substrate 106 and/or process adjustments for the process tool 102.

In step 816 the optical properties (e.g., the thickness D2 and/or D1) are compared with respective physical properties of the substrate 106 (e.g., the direct measurements of an actual cross-section 400 from light microscopy, SEM, and so forth), cross-section In step 818 the optical relationship between the optical properties of the substrate and the desired optical properties are calculated using the comparison of step 816. The comparison of step 816 may be used to calculate constants (e.g., $K_1$, $K_2$, etc.) for the relationships of Equation 1, Equation 2, and any other equations of interest. Optionally, the comparison of step 816 is used in step 818 to calculate constants (e.g., $H_1$, $H_2$, and/or $C_1$) for process relationships represented by Equation 3 and/or Equation 4. In some embodiments, the accuracy of the constants such as $K_1$, $K_2$, $H_1$, $H_2$, $C_1$, etc., may be improved using historical data from measurements of previous substrates 106. Furthermore, in step 818, the process parameters are calculated using the comparisons of step 816 and the process relationships.

Upon calculating the optical properties, the process parameters, and/or process relationships at step 818, the method 800 returns to step 802 where subsequent substrates in the production environment 100 may be placed in the metrology tool 104 for measuring and for providing further data for comparison at step 816 and refining constants at step 818.

Although the methods 600, 700, and 800 are described as being comprised of various steps, fewer or more steps may comprise the methods 600, 700, and/or 800 and still fall within the scope of various embodiments.

Several embodiments are specifically illustrated and/or described herein. However, it will be appreciated that modifications and variations are covered by the above teachings and within the scope of the appended claims without departing from the spirit and intended scope thereof. For example, the emitted light beam may be emitted at a moving substrate (e.g., translation and/or rotation). Alternatively, the emitter/receiver array may be configured for translation and/or rotation with respect to the substrate. The emitter/receiver may emit the light beam and/or receive the reflected light via fiber optics. The reflected light beam may be received from a moving substrate. Various embodiments of the invention include logic stored on computer readable media, the logic configured to perform methods of the invention.

The embodiments discussed herein are illustrative of the present invention. As these embodiments of the present invention are described with reference to illustrations, various modifications or adaptations of the methods and or specific structures described, may become apparent to a person with ordinary skill in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for instructing a process tool to make adjustments to a process comprising the steps of:
    emitting a first incident light beam at a first substrate;
    receiving a first reflected light beam from the first substrate;
    determining a first spectrum of the first reflected light beam;
    determining a first property of a first layer of the first substrate based at least in part on the first spectrum;
    determining a second property of a second layer of the first substrate based at least in part on the first spectrum;
    determining a virtual cross-section of the substrate based on the first property and the second property;
    comparing the first property to a first reference property;
    comparing the second property to a second reference property;
    wherein comparing the first property to the first reference property and comparing the second property to the second reference property comprises comparing the virtual cross-section of the substrate to a desired cross section;
    determining desired adjustments to the process to make the properties of the first and second layers more closely conform to the first and second reference properties, based at least in part on the first property comparison and the second property comparison; and
    providing instructions to the process tool to make the desired adjustments.

2. The method of claim 1, further comprising adjusting a process of the process tool based on the provided instructions.

3. The method of claim 1, further comprising adjusting a process of the process tool based on comparing the first property and the second property to a previous first property and a previous second property.

4. The method of claim 1, wherein determining the first property is also based on the first reference property.

5. The method of claim 1, wherein determining the second property is also based on the second reference property.

6. The method of claim 1, wherein determining the first property is also based on the first and second reference property.

7. The method of claim 1, wherein the step of determining what adjustments to the process are appropriate is further based on a comparison of the first property to the second property.

8. The method of claim 1, further comprising processing a second substrate.

9. The method of claim 8, further comprising:
emitting a second incident light beam at the second substrate;
receiving a second reflected light beam from the second substrate;
determining a second spectrum of the second reflected light beam;
determining a property of a layer of the second substrate based on the second spectrum;
determining a relationship based on a comparison of the first property of the first substrate to the property of the second substrate;
modifying the instructions based on the relationship; and
providing the modified instructions to the process tool.

10. The method of claim 9, further comprising adjusting a process of the process tool based on the provided instructions.

11. The method of claim 1, further comprising:
emitting an incident light beam at a reference substrate;
receiving a reflected light beam from the reference substrate;
determining a reference spectrum of the reflected light beam from the reference substrate;
determining a first reference property of a first layer of the reference substrate based on the reference spectrum; and
determining a second reference property of a second layer of the reference substrate based on the reference spectrum.

12. The method of claim 1, wherein the first property is the thickness of the first layer of the first substrate.

13. The method of claim 1, wherein the first property is the index of refraction of the first layer of the first substrate.

14. The method of claim 1, wherein the first property is the coefficient of extinction of the first layer of the first substrate.

15. The method of claim 1, wherein the diameter of the first incident light beam is larger than 19 millimeters.

16. A computer readable medium having embodied thereon a program, the program being executable by a computing device for performing a method for providing instructions a process tool to make adjustments to a process comprising the steps of:
emitting a first incident light beam at a first substrate;
receiving a first reflected light beam from the first substrate;
determining a first spectrum of the first reflected light beam;
determining a first property of a first layer of the first substrate based on the first spectrum;
determining a second property of a second layer of the first substrate based on the first spectrum;
determining a virtual cross-section of the substrate based on the first property and the second property;
comparing the first property to a first reference property;
comparing the second property to a second reference property;
wherein comparing the first property to the first reference property and comparing the second property to the second reference property comprises comparing the virtual cross-section of the substrate to a desired cross section;
determining what adjustments to the process are appropriate to make the properties of the first and second layers more closely conform to the first and second reference properties based on the first property comparison and the second property comparison; and
providing instructions to the process tool to make the appropriate adjustments.

17. The method of claim 16, further comprising adjusting a process of the process tool based on the provided instructions.

18. The method of claim 16, further comprising processing a second substrate using the instructions.

19. The method of claim 18, further comprising:
emitting a second incident light beam at the second substrate;
receiving a second reflected light beam from the second substrate;
determining a second spectrum of the second reflected light beam;
determining a property of a layer of the second substrate based on the second spectrum;
determining a relationship based on a comparison of the first property of the first substrate to the property of the second substrate;
modifying the instructions based on the relationship; and
providing the modified instructions to the process tool.

20. The method of claim 16, further comprising:
emitting an incident light beam at a reference substrate;
receiving a reflected light beam from the reference substrate;
determining a reference spectrum of the reflected light beam from the reference substrate;
determining a first reference property of a layer of the reference substrate based on reference spectrum; and
determining a second reference property of a second layer of the reference substrate based on the reference spectrum.

21. The method of claim 16, wherein the first property is the thickness of the first layer of the first substrate.

22. The method of claim 16, wherein the first property is the index of refraction of the first layer of the first substrate.

23. The method of claim 16, wherein the first property is the coefficient of extinction of the first layer of the first substrate.

24. The method of claim 18, wherein the diameter of the first incident light beam is larger than 19 millimeters.

25. A metrology tool for instructing a process tool to make adjustments to a process comprising:
an emitter configured to emit an incident light beam at a first substrate;
a receiver configured to receive a reflected light beam from the first substrate;
a spectrometer configured to determine the spectrum of the reflected light beam; and
a processor configured to:
determine a first property of a first layer of the first substrate based on the spectrum;
determine a second property of a second layer of the first substrate based on the spectrum;
determining a virtual cross-section of the substrate based on the first property and the second property;
compare the first property to a first reference property;
compare the second property to a second reference property; and wherein comparing the first property to the first reference property and comparing the second property to the second reference property comprises comparing the virtual cross-section of the substrate to a desired cross section;

determine what adjustments to the process are appropriate to make the properties of the first and second layers more closely conform to the first and second reference properties based on the first property comparison and the second property comparison; and provide the instructions to the process tool to make the appropriate adjustments.

26. The metrology tool of claim 25, wherein the process tool is further configured to adjust a process of the process tool based on the provided instructions.

27. The metrology tool of claim 25, wherein the process tool is further configured to process a second substrate using the instructions.

28. The metrology tool of claim 27, wherein the processor is further configured to:

receive a first property of a second substrate; and modify the determined what adjustments to the process are appropriate based on a comparison of the first property of the first substrate to the first property of the second substrate.

29. The metrology tool of claim 25, wherein the first property is the thickness of the first layer of the first substrate.

30. The metrology tool of claim 25, wherein the first property is the index of refraction of the first layer of the first substrate.

31. The metrology tool of claim 25, wherein the first property the coefficient of transmission of the first layer of the first substrate.

32. The metrology tool of claim 25, wherein the diameter of the incident light beam is larger than 19 millimeters.

* * * * *